United States Patent Office 3,079,441
Patented Feb. 26, 1963

3,079,441
2-HYDRAZINO-OCTANE SULFATE
Esther Ber and Frajda Dvolaitzky, Paris, and Jean Marcel Guilbert, Montrouge, France, assignors to Societe Civile Auguil, Paris, France, a French body corporate
No Drawing. Filed Nov. 25, 1960, Ser. No. 71,442
Claims priority, application Great Britain Nov. 26, 1959
2 Claims. (Cl. 260—583)

The present invention relates to new hydrazine derivatives responding to the general formula:

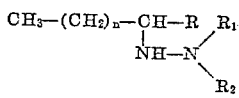
(I)

in which R is an alkyl radical, $R_1$ and $R_2$ are each hydrogen, an alkyl or acyl radical, and $n$ is a whole number from 3 to 9, these derivatives being in the form of salts with organic or mineral acids where $R_1$ and $R_2$ are both hydrogen.

These compounds are of interest as therapeutic products. Actually they constitute stimulants of the central nervous system by inhibiting an enzyme: monoaminooxidase, which decomposes the endogenous stimulant amines such as noradrenalin, adrenalin, serotonin, etc.

Among the compounds of the general Formula I, particular preference is given to those in which R is a methyl radical, $R_1$ and $R_2$ are each hydrogen, an alkyl radical having 1 to 3 carbon atoms, or an acyl radical having 2 to 5 carbon atoms and $n$ is equal to 4 or 5.

The invention has also for its object a process of preparing the compounds of the general Formula I, according to which a ketone of the formula:

$$CH_3—(CH_2)_n—CO—R$$

is condensed with a hydrazine of the formula:

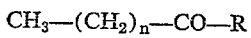

in which formulae R, $R_1$, $R_2$ and $n$ have the above designations, thus obtaining a hydrazone which is thereafter hydrogenated and, thereafter, salified when $R_1$ and $R_2$ are both hydrogen.

The condensation is advantageously carried out within a solvent such as methyl alcohol. It takes place conveniently at room temperature and may be completed by refluxing for a short time.

The hydrogenation of the hydrazone may be effected catalytically, the catalyser being platinum, for example.

When $R_1$ and $R_2$ are both hydrogen, the final hydrazine derivative is easily isolated in the form of the oxalate, which may be converted into another salt or into the free base.

In view of their therapeutic use, the new compounds according to the invention may be prepared in composition form in association with an administrable therapeutically inert vehicle.

This vehicle may be any of the usual solid excipients suitable for the preparation of tablets or capsules administrable by mouth. It may also be a liquid such as sterile twice-distilled water with the addition of a bacteriostatic, for the preparation of ampoules for injection or drinking.

The compounds according to the invention may thus be administered in the form of the above compositions at the rate of 10 to 30 mg. of active principle per day.

The following example illustrates the invention without however being limitative.

EXAMPLE

Preparation of 2-Hydrazino-Octane Sulphate

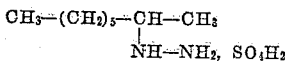

100 g. of methylhexylketone are dissolved in 100 cu. cm. of absolute methyl alcohol and the solution is poured slowly into a solution of 116 g. of hydrazine hydate in 116 cu. cm. of methyl alcohol, whilst maintaining the temperature of the resulting solution at between 28 and 30° C.; the solution is thereafter refluxed for 10 minutes.

The alcohol and a portion of the excess hydrazine are evaporated under a vacuum.

The residue is extracted by ether which dissolves the hydrazone formed and the ether is then distilled off under a vacuum. The residue formed of crude hydrazone is dissolved in 1000 cu. cm. ethyl alcohol at 95°, and 100 cu. cm. of glacial acetic acid and 4.6 g. of platinum oxide are added.

The whole is hydrogenated by hydrogen under pressure and at ordinary temperature, until the end of absorption (duration 1 hr. to 1 hr. 30 min. approx.). The solution is decanted, the platinum is washed with a little alcohol, and the decanted solution combined with the washing alcohol is distilled to dryness under vacuum. The residue (consisting of impure 2-hydrazino-octane acetate) is dissolved in 650 cu. cm. of water. 86 g. of benzoic aldehyde are added to the solution obtained and the mixture is heated for 10 minutes at 50° C. under mechanical agitation.

It is cooled and extracted with ether.

This ethereal solution is introduced into an aqueous solution containing 140 g. of oxalic acid and the whole is steam distilled.

Remaining in the aqueous solution is 2-hydrazinooctane oxalate which is then allowed to crystallize in the refrigerator.

This product re-crystallized in absolute alcohol has an instantaneous melting point of 133–134° C.

Quantity obtained: 48 to 50 g. approximately.

The oxalate thus obtained is converted into sulphate in the following manner:

15 g. of 2-hydrazino-octane oxalate are dissolved in 120 cu. cm. of NaOH 0.5 N and the pH is brought to 7 by the addition of NaOH.

When the whole is dissolved, 90 cu. cm. of ether are added and then 135 cu. cm. of 0.5 N soda.

The solution is extracted with ether, the extract washed with water and dried on sodium sulphate.

Whilst keeping the temperature at 50° C., 6 g. of pure sulphuric acid, say approximately 1 molecule per molecule of 2-hydrazino-octane, are added. A precipitate of 2-hydrazino-octane sulphate is formed and this is left overnight in the refrigerator.

It is separated, washed with ether and dried.

This produces about 13 g. of 2-hydrazino-octane sulphate with an instantaneous melting point of 78 to 80° C.

Therapeutic compositions into which the 2-hydrazino-octane sulphate enters, are inter alia, as follows:

(a) Tablets:
  2-hydrazino-octane sulphate _____ 5 mg.
  Lactose and kaolin, quantity sufficient for___ 100 mg.
(b) Solution for parenteral injection:
  2-hydrazino-octane sulphate _____ 5 mg.
  Sodium salt of Nipasol _____ 2 mg.
  Sterile twice-distilled water, quantity sufficient for _____ 1 ml.

The above concentration of the tablets and of the injectable solution are of course, not limiting.

The dosage of these therapeutic forms is usually from 10 to 30 mg. of active principle per day.

The term "Nipasol" appearing in the foregoing example is defined in Merck Index of Chemicals and Drugs, 7th edition (1960), page 864 as follows:

"Propyl p-Hydroxybenzoate. Nipasol; Propylparaben; Propylparasept. $HO.C_6H_4.COO.C_3H_7$; mol. wt. 180.20. $C_{10}H_{12}O_3$; C, 66.65%, H, 6.71%, O, 26.64%, propyl alcohol 33.35%, hydroxybenzoic acid 76.65%.

White crystals. M. 96–97°. Soluble in 2000 parts water; soluble in alcoh., ether, acetone.

"Med. Use: Prophylaxis and treatment of fungus infections; for preservation of numerous nonparenteral pharmaceutical preparations by virtue of its bacteriostatic effect. Dose: Topical, 5% ointment. For prophylaxis of moniliasis during broad spectrum antibiotic therapy, a 4:1 mixture of methyl-p-hydroxy-benzoate and propyl p-hydroxybenzoate has been employed orally (0.8 to 1.42 g. of total esters daily), vaginally or rectally, As preservative, approximately 0.05% concn."

Having now described my invention what we claim as new and desire to secure by Letters Patent is:

1. Acid addition salts of hydrazines having the formula:

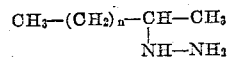

in which $n$ is an integer from 4 to 5, and in which said salts are sulphates.

2. 2-hydrazino-octane sulphate.

References Cited in the file of this patent

UNITED STATES PATENTS

| | | |
|---|---|---|
| 2,857,424 | Cox | Oct. 21, 1958 |
| 2,927,111 | Biel | Mar. 1, 1960 |

FOREIGN PATENTS

| | | |
|---|---|---|
| 695,513 | Great Britain | Aug. 12, 1953 |
| 208,832 | Austria | Apr. 25, 1960 |